United States Patent
de Raad et al.

(10) Patent No.: US 12,494,634 B2
(45) Date of Patent: Dec. 9, 2025

(54) CLAMP DEVICE ACTIVATION FROM ESD CLAMP TRANSISTOR BODY CONTACT

(71) Applicant: NXP B.V., Eindhoven (NL)

(72) Inventors: Gijs Jan de Raad, Bemmel (NL); Guido Wouter Willem Quax, Wijchen (NL); Alma Anderson, Chandler, AZ (US)

(73) Assignee: NXP B.V., Eindhoven (NL)

( * ) Notice: Subject to any disclaimer, the term of this patent is extended or adjusted under 35 U.S.C. 154(b) by 137 days.

(21) Appl. No.: 18/586,632

(22) Filed: Feb. 26, 2024

(65) Prior Publication Data
US 2025/0273953 A1 Aug. 28, 2025

(51) Int. Cl.
H02H 9/04 (2006.01)

(52) U.S. Cl.
CPC ................... H02H 9/046 (2013.01)

(58) Field of Classification Search
CPC ........................................ H02H 9/046
USPC .......................................................... 361/56
See application file for complete search history.

(56) References Cited

U.S. PATENT DOCUMENTS

| | | | |
|---|---|---|---|
| 5,781,388 A * | 7/1998 | Quigley | H10D 89/601 |
| | | | 361/111 |
| 5,956,219 A * | 9/1999 | Maloney | H02H 9/046 |
| | | | 361/111 |
| 5,959,488 A | 9/1999 | Lin et al. | |
| 8,093,623 B2 | 1/2012 | Mawatari et al. | |
| 8,335,064 B2 | 12/2012 | Soldner et al. | |
| 8,531,807 B2 | 9/2013 | Soldner et al. | |
| 11,114,429 B2 | 9/2021 | Karp | |
| 2007/0053120 A1 * | 3/2007 | Gauthier | H02H 9/046 |
| | | | 361/56 |
| 2010/0140712 A1 | 6/2010 | Russ | |
| 2017/0155243 A1 * | 6/2017 | Tan | H02H 9/046 |
| 2019/0260203 A1 * | 8/2019 | Seidl | H10D 89/814 |
| 2020/0343237 A1 | 10/2020 | Karp | |
| 2023/0268338 A1 * | 8/2023 | Galy | H10D 89/611 |
| | | | 257/288 |

FOREIGN PATENT DOCUMENTS

| | | | | |
|---|---|---|---|---|
| CN | 103022996 A | * | 4/2013 | ............. H02H 9/046 |
| CN | 113675830 B | | 11/2021 | |
| EP | 4471860 A1 | * | 12/2024 | ........... H10D 62/378 |
| FR | 3131981 A1 | * | 7/2023 | ........... H10D 89/611 |
| JP | 2011114056 A | | 6/2011 | |

* cited by examiner

Primary Examiner — Dharti H Patel
(74) Attorney, Agent, or Firm — David G. Dolezal (57) ABSTRACT

An ESD circuit includes an ESD clamp device with an ESD clamp transistor. The ESD clamp transistor has two sets of one or more body contacts. One set is coupled to a supply voltage rail and the other set is coupled to a clamp activation circuit. The clamp activation circuit is coupled to a clamp device. During an electrical stress event of a sufficient severity affecting a supply voltage rail, the activation circuit makes the clamp device conductive to transfer charge between supply voltage rails.

20 Claims, 11 Drawing Sheets

CLAMP DEVICE ACTIVATION FROM ESD CLAMP TRANSISTOR BODY CONTACT

BACKGROUND OF THE INVENTION

Field of the Invention

This invention relates to an ESD circuit with a clamp device activation circuit coupled to one or more body contacts of an ESD clamp transistor.

Background

Some semiconductor die utilize electrostatic discharge (ESD) clamp devices for discharging charge from an ESD event affecting a die terminal. One example of an ESD clamp device is a clamp transistor such as a Field Effect Transistor (FET) (e.g., an NFET).

An ESD event is a type of electrical stress event. An ESD event may occur when a charged object (e.g., a human finger) inadvertently contacts a conductive surface of a semiconductor die (e.g., a contact pad) or a conductive surface of a semiconductor die package coupled to the pad where charge at an elevated voltage is applied to the conductive surface due to the contact. Being at an elevated voltage, such charge may cause voltage differentials across the devices of the semiconductor die that may exceed their safe operating areas and damage those devices. An ESD event may also occur when a charged conductive surface of a circuit contacts an external object where charge is transferred between the conductive surface and the external object. Semiconductor die may be subject to other types of electrical stress events such as over current conditions or over voltage conditions.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates identical items unless otherwise noted. The Figures are not necessarily drawn to scale.

DETAILED DESCRIPTION

The following sets forth a detailed description of a mode for carrying out the invention. The description is intended to be illustrative of the invention and should not be taken to be limiting.

As disclosed herein, an ESD circuit includes an ESD clamp device with an ESD clamp transistor. The ESD clamp transistor has two sets of one or more body contacts. One set is coupled to a supply voltage rail and the other set is coupled to a clamp activation circuit. The clamp activation circuit is coupled to a clamp device. During an electrical stress event of a sufficient severity affecting a supply voltage rail, the activation circuit makes the clamp device conductive to transfer charge between supply voltage rails.

In some embodiments providing a clamp activation circuit having an input to a second set of one or more body contacts may allow for the clamp activation circuit to detect an impact ionization condition of the ESD clamp transistor as a result an electrical stress event and provide for a mechanism to transfer charge between supply voltage rails to alleviate the impact ionization where such mechanism can operate effectively over a relatively wide range of temperatures.

Figure 1:
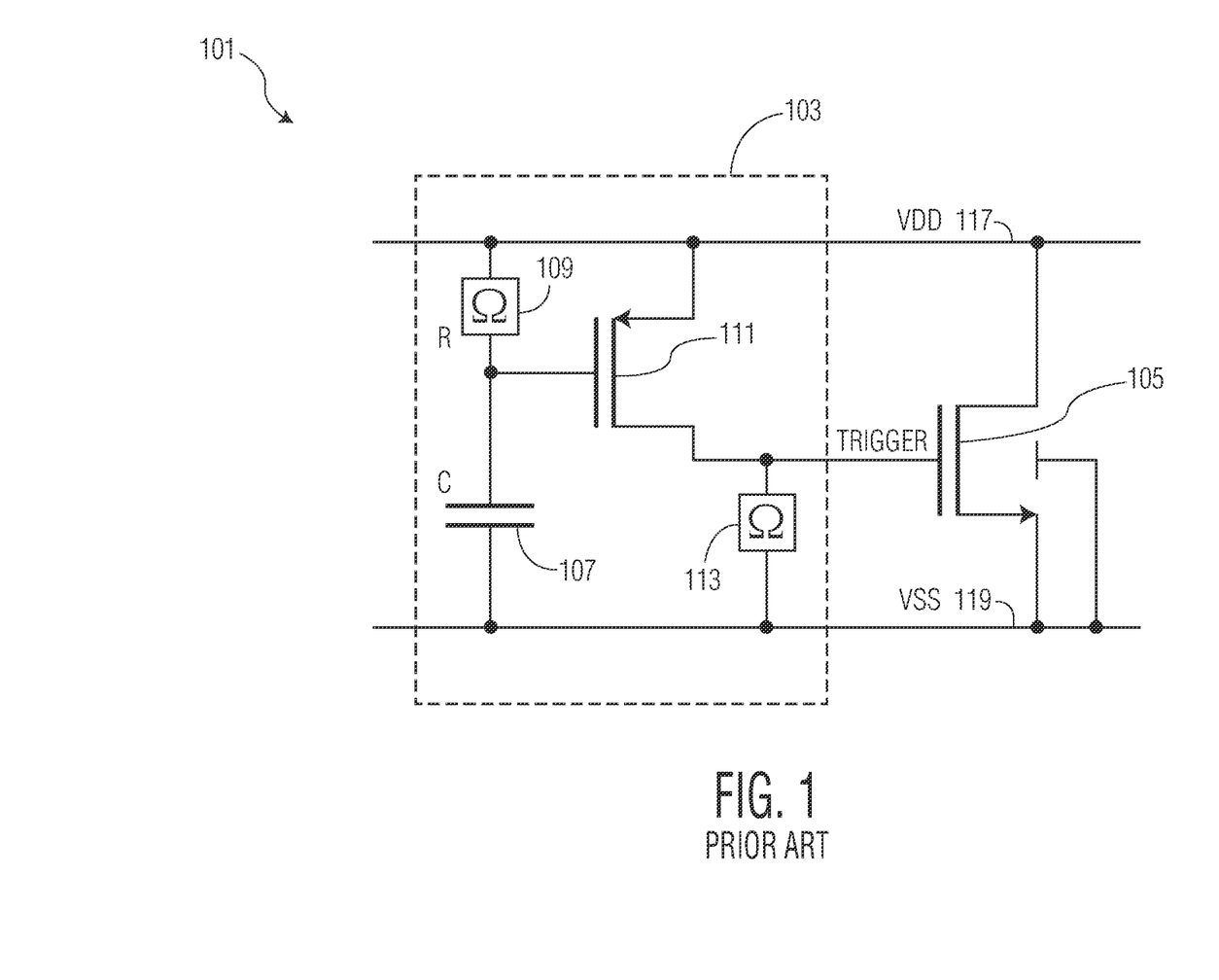
FIG. 1 is a circuit diagram of a prior art ESD circuit.

FIG. 1 is a circuit diagram of a prior art ESD circuit 101. ESD circuit 101 includes a trigger circuit 103 and an ESD clamp device implemented with a clamp transistor 105. Clamp transistor 105 is an NFET having drain connected to a VDD supply voltage rail 117 and a source connected a VSS supply voltage rail 119. The body contacts of transistor 105 are connected to VSS supply voltage rail 119. The gate of transistor 105 is connected to the output of trigger circuit 103 to receive a TRIGGER signal. Trigger circuit 103 includes a resistor 109 and capacitor 107, each including a terminal connected to the gate of PFET 111. The source of PFET 111 connected to VDD supply voltage rail 117. The drain of PFET 111 is connected to the gate of transistor 105 and to resistor 113 to provide the TRIGGER signal.

Trigger circuit 103 is characterized as an RC trigger circuit and configured to be activated by a fast rise time voltage differential between VDD supply voltage rail 117 and VSS supply voltage rail 119. Prior to an ESD event that affects VDD supply voltage rail 117, the voltage differential between the voltage at the gate of PFET 111 and voltage of VDD supply voltage rail 117 is less than the threshold voltage of PFET 111. At the beginning of a detected ESD event that affects VDD supply voltage rail 117, the voltage at the gate of PFET 111 is initially at a low voltage with respect to the ESD-elevated voltage of VDD supply voltage rail 117. With its gate being a low voltage with respect to rail 117, PFET 111 begins to conduct to bias the gate of ESD clamp transistor 105 from a low-voltage, nonconductive state to a high-voltage, conductive state where clamp transistor 105 becomes conductive to transfer charge from the ESD event on rail 117 to rail 119 to reduce the voltage differential between rail 117 and rail 119. PFET 111 remains conductive for a predetermined period of time that is dependent upon the RC time constant of resistor 109 and capacitor 107. As the charge on capacitor 107 rises from the elevated voltage on VDD supply voltage rail 117, the voltage of the gate of PFET 111 also rises. When the voltage differential between the voltage of rail 117 and the voltage of the gate of PFET 111 falls below the threshold voltage of PFET 111, the TRIGGER signal is de-asserted to a nonconductive bias voltage and transistor 105 becomes nonconductive.

Figure 2:
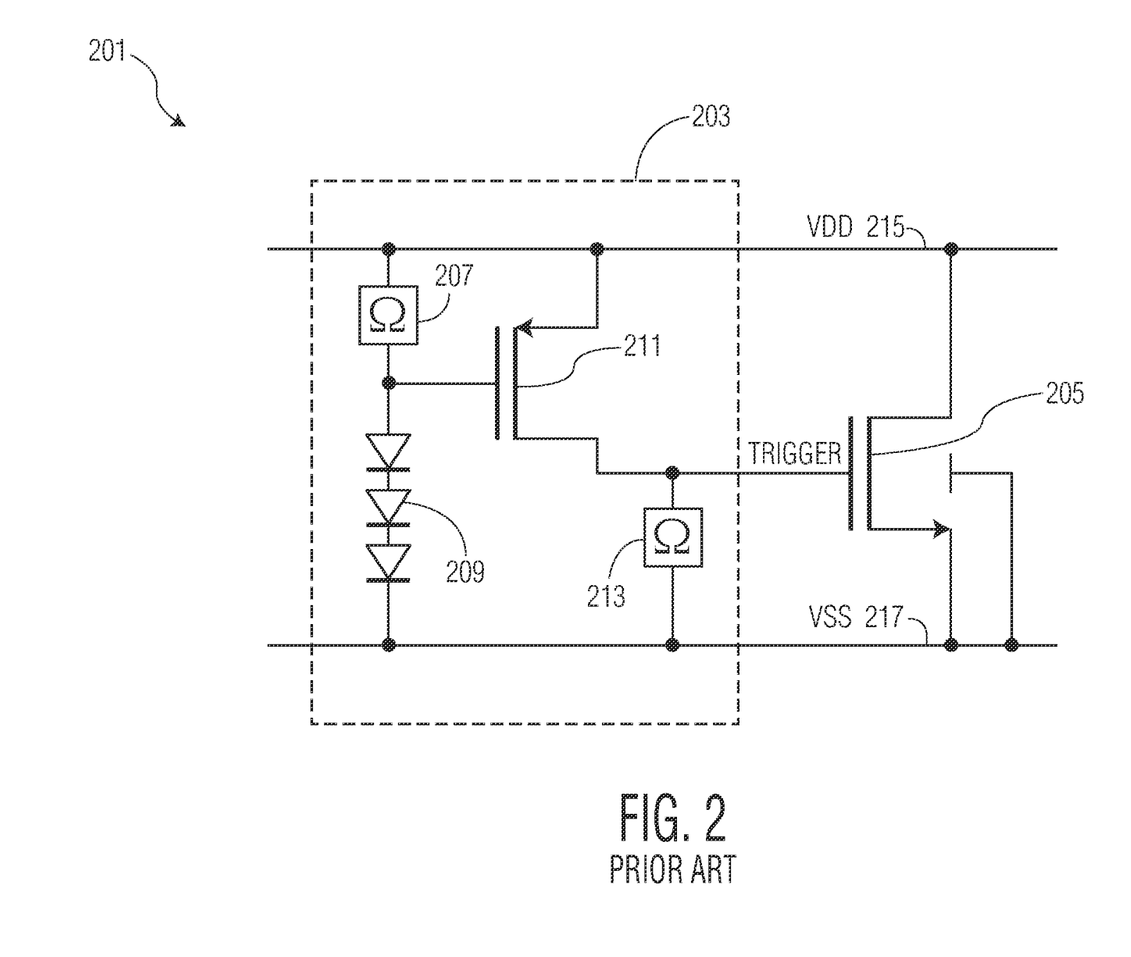
FIG. 2 is a circuit diagram of a prior art ESD circuit.

FIG. 2 is a circuit diagram of another prior art ESD circuit 201 with a different type of trigger circuit 203 that includes a resistor 207 and a string of diodes 209 coupled in series between VDD supply voltage rail 215 and VSS supply voltage rail 217. The gate of PFET 211 is connected to a node between resistor 207 and string of diodes 209. The source of PFET 211 is connected to VDD supply rail 215 and the drain is connected to the gate of ESD clamp transistor 205 to provide the TRIGGER signal. A resistor 213 is connected to the gate of transistor 205 and VSS supply rail 217.

During an ESD event affecting rail 215, the voltage of rail 215 rises above the cumulative threshold voltage of the string of diodes 209. PFET 211 becomes conductive to assert a trigger signal when the voltage differential between rail 215 and the gate of PFET 211 is greater than the threshold voltage of PFET 211. With the trigger signal being asserted, clamp transistor 205 becomes conductive to discharge ESD charge from rail 215 to rail 217. The TRIGGER signal is asserted as long as the voltage differential between the voltage of rail 215 and the threshold voltage of diode strings 209 is greater than the threshold voltage of PFET 211. One issue with utilizing a diode string for trigger signal control is that the activation and deactivation voltages are relatively sensitive to temperature, especially at higher voltages. Accordingly, achieving the proper operation of the trigger circuit over an entire temperature range (e.g., −40 C to 125 C) may be very difficult.

Figure 3:
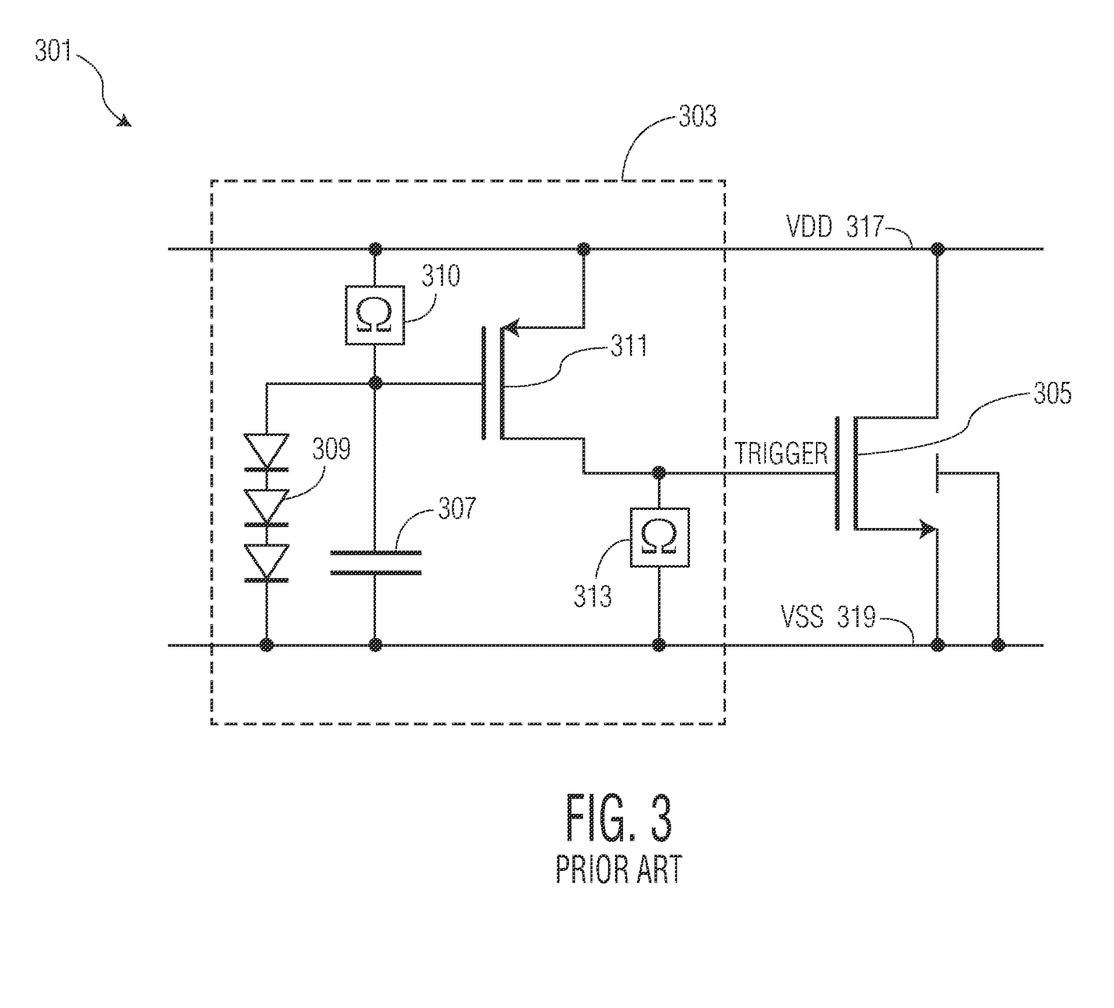
FIG. 3 is a circuit diagram of a prior art ESD circuit.

FIG. 3 is a circuit diagram of another prior art ESD circuit. ESD circuit 301 includes a trigger circuit 303 and an ESD clamp transistor 305 for discharging ESD current from VDD supply voltage rail 317 to VSS supply voltage rail 319. Trigger circuit 303 is a combination of the RC trigger mechanism of trigger circuit 103 of FIG. 1 and the overvoltage detection string of diodes 309 mechanism of trigger circuit 203. The on-time of the RC mechanism of trigger circuit 303 is determined by the RC time constant of resistor 310 and capacitor 307. However, the TRIGGER signal stays active as long as the drain of PFET 311 is above the cumulative threshold voltage of the diode string 309 plus the threshold voltage of PFET 311. Trigger circuit 303 also includes a resistor 313. In some examples, the string of diodes 209 and 309 in the examples of FIGS. 2 and 3 respectively may be replaced with a Zener diode.

Issues may arise when an ESD clamp transistor is subjected to electronic stresses that last longer than its designed on-time. These electronic stress events are typically longer than pulses from typical ESD events. Most ESD events last no longer than 500 nanoseconds, but some electrical stress events may last as long as 5-10 microseconds. Examples of such electrical stress events include cable discharge events or transient ringing events that occur when a semiconductor die (or a board containing the semiconductor die) is connected to some other system or device. Also, electrical stress events may occur during "hot plugging" where two devices are connected together and at least one of the devices is powered up.

During an electrical stress event of an intensity that is less than a maximum intensity for which an ESD clamp transistor is designed for (e.g., such as from a typical ESD event), the clamp transistor operates entirely in MOS mode to sink ESD current, and therefore is safe from damage. However, for more intense electrical stress events, the I-V curve of the ESD clamp transistor deviates from linear MOS mode behavior as an additional mechanism for current conduction becomes active. In addition to conducting electrical stress current in MOS mode, the clamp transistor starts to conduct current generated by impact ionization in the transistor as well. Where MOS mode current flows through an ESD clamp transistor from its drain to its source, the impact ionization current flows through the clamp transistor from its drain to its body contact. Generally, as long as the pulse duration of the stress event is significantly shorter that the on-time of the trigger circuit (103), the clamp transistor is relatively safe from damage.

However, if a relatively intense electrical stress pulse lasts longer than the on-time of the trigger circuit, the impact ionization mode of operation may cause damage to the clamp transistor. As the clamp transistor conducts current that includes impact ionization current, it generates heat internally which raises the temperature of the semiconductor material of the transistor. If the temperature goes beyond a critical limit, the clamp transistor may be damaged.

When an ESD clamp transistor is subjected to an even more intense electrical stress event, it may be damaged outright. At such an intensity, the current generated by internal impact ionization becomes strong enough to bias the internal NPN bipolar transistor of an NFET. In such a condition, an instability develops in the transistor. When one part of a clamp transistor conducts more current than the other parts, the internally generated impact ionization current in that area becomes stronger, which causes the total current in the area to increase, which in turn leads to even more localized impact ionization and more ionization current, and so on. The end result is that almost the entire current flow becomes confined to a small sub-region of the clamp transistor. This effect is sometimes called "second snapback" or "current filamentation." The typical end result is that the ESD clamp transistor has a short between its drain and source. Thus, the semiconductor die can no longer operate normally since the ESD clamp transistor needs to be nonconductive when the semiconductor die is in normal operation (i.e., when there is no ESD event or other electrical stress event occurring). The severity of an electrical stress event has both an intensity component and a duration component.

In some instances, a clamp device may be subjected to electrical stress pulses that last longer than the on-time that the ESD clamp transistor was designed for. Such issues may arise when a pulse of a relatively low electrical stress voltage (e.g., between the normal voltage of VDD and twice the normal voltage of VDD) is applied to the drain of the RC triggered clamp device, via a cable that has a significant amount of inductance. For example, a one foot charger cable may have approximately 300 nH of parasitic inductance.

When current flows through a device that has inductance, the system resists changes in that current. When the current passing through the inductive device increases, an inductive voltage builds across this device that counteracts the increase in current. When the current passing through the inductive device decreases, a similar inductive voltage builds across the device that seeks to maintain the current at its original value. Note that these increases in voltage are temporary and decrease over time.

Figure 4:
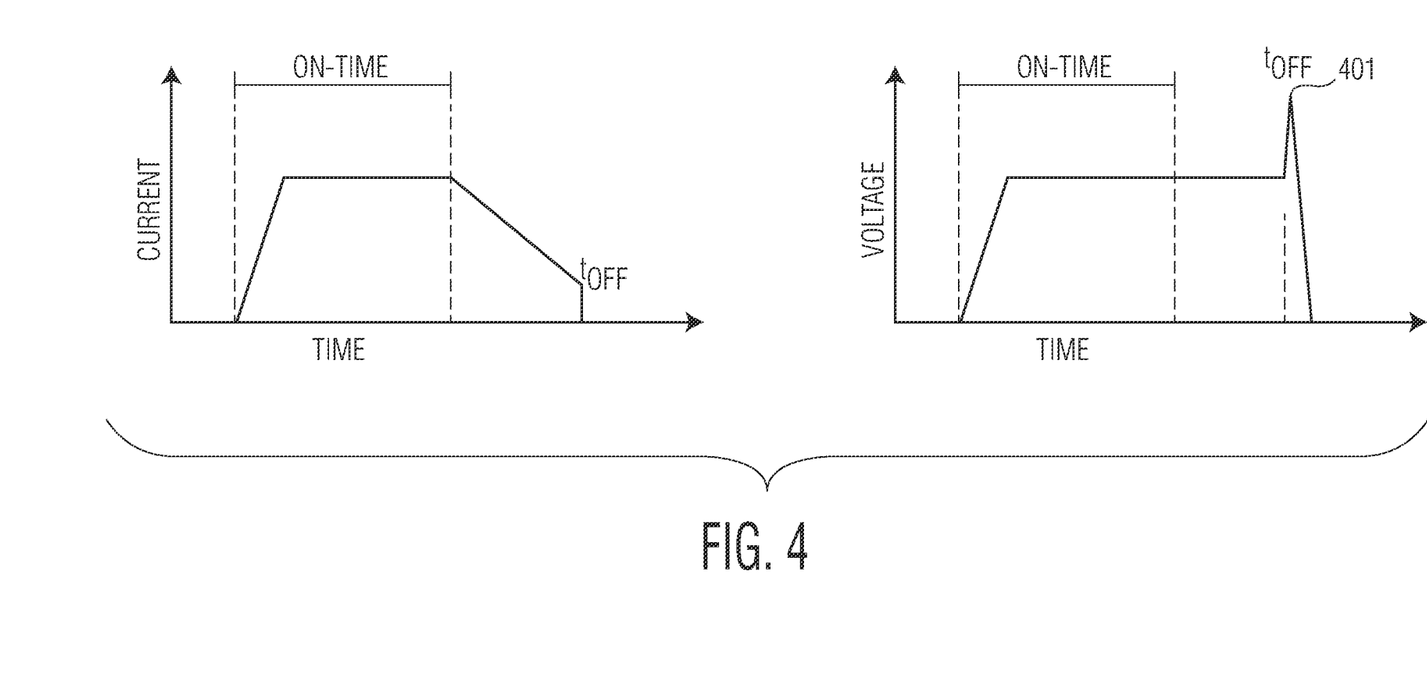
FIG. 4 is a graph of current and voltage of a prior art ESD circuit during an electrical stress event.

FIG. 4 is a graph of current and voltage of a clamp transistor 105 during an electrical stress event where a supply voltage is abruptly applied to a VDD pad (not shown) of a semiconductor die via a cable (not shown) containing a relatively significant amount of inductance. Because of the abrupt application of the voltage, the trigger circuit 103 triggers and asserts the TRIGGER signal for a period of time (ON-TIME) to make transistor 105 conductive such that transistor 105 begins to conduct current. At the end of the ON-TIME period, transistor 105 becomes less and less conductive. This is depicted by the decreasing current in FIG. 4 between the end of the ON-TIME period and $t_{OFF}$.

During this time interval, the voltage seen by clamp transistor 105 may remain the same, increase, or decrease, depending upon conditions (although the example of FIG. 4 shows it remaining the same).

At the point designated by $t_{OFF}$, transistor 105 switches off completely, which tends to be abrupt as the gate-source bias voltage of transistor 105 sinks below its threshold voltage. Since the cable that delivers the voltage to the semiconductor die VDD rail 117 has a relatively significant inductance, the abrupt decrease in current causes an inductive voltage spike 401 across the cable which appears at the drain of clamp transistor 105. In some cases, this voltage spike can generate impact ionization current in transistor 105 that can damage the transistor. The inductive voltage-overshoot scenario described above is just one of several mechanisms by which an overvoltage condition could occur across an RC-triggered clamp device.

What is desirable is an ESD circuit that can selectively continue to discharge electrical stress charge after an ESD on-time period has expired to prevent damage to a clamp device in certain situations. What is also desirable is a circuit that can detect when a severe electrical stress event is affecting an ESD clamp transistor and assert a clamp device to prevent damage to an ESD clamp device. What is further desired is an ESD circuit that is able to effectively implement these features over a wide operating temperature range.

Figure 5:
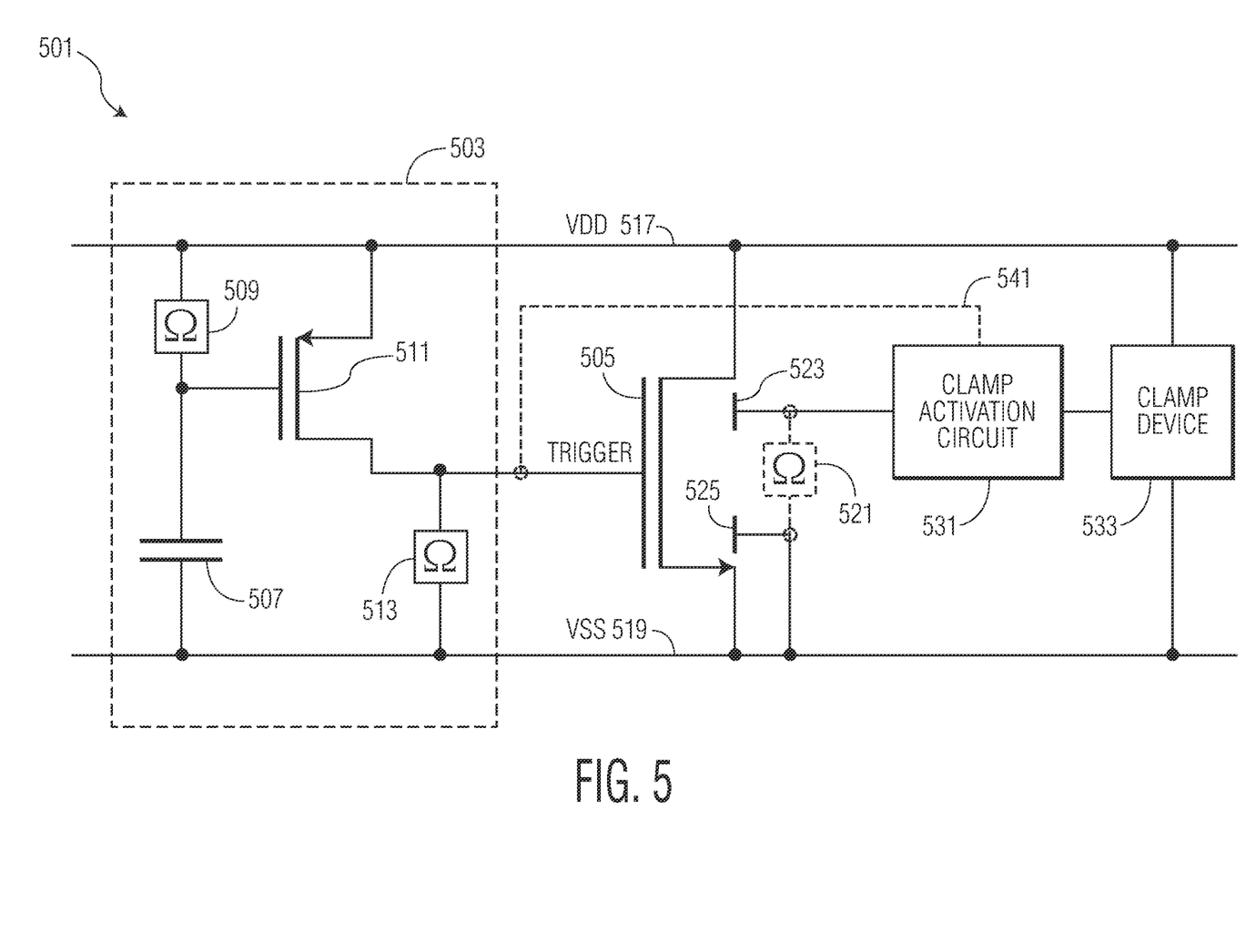
FIG. 5 is a circuit diagram of an ESD circuit according to one embodiment of the present invention.

FIG. 5 is a circuit diagram of an ESD circuit according to one embodiment of the present invention. ESD circuit 501 is located in a semiconductor die and is used to protect other circuitry of the die (not shown) during an ESD event affecting VDD supply rail 517, which is a supply rail to the other circuitry. An ESD event affecting rail 517 can occur from an ESD event at a die pad or package pad (neither shown) that supplies rail 517. Examples of other circuitry that may be located in a semiconductor die protected by ESD circuit 501 include digital, analog and mixed signal circuitry, memories, processing circuitry, communication circuitry, and sensors, although other types of circuitry may be protected as well. In addition, a die may contain multiple circuits similar to circuit 501 located on rail 517 distributed throughout the die. Also, a die may contain multiple ESD circuits similar to circuit 501 for each supply voltage rail.

ESD circuit 501 includes a trigger circuit 503 that detects an ESD event affecting rail 517 and asserts a trigger signal (TRIGGER) to make an ESD clamp device conductive to discharge ESD current from the ESD event. In the embodiment shown, the ESD clamp device is implemented with a single NFET 505 having a drain connected to VDD supply voltage rail 517 and a source connected to VSS supply voltage rail 519. However, other embodiments may include other types of ESD clamp devices that are made conductive in response to a trigger signal. Other types of ESD clamp devices may include a PFET, another type of transistor (e.g., bipolar transistors), or multiple transistors connected in series between VDD rail 517 and VSS rail 519. In some embodiments, a clamp device may be implemented with a thyristor where at least one of the N-well or P-well is driven by the TRIGGER signal. In some embodiments, a trigger circuit output may be connected to a trigger circuit bus that triggers multiple ESD clamp devices connected rail 517. In one embodiment, VSS supply voltage rail 519 is at a ground voltage, but may be at another voltage (e.g., a negative voltage) in another embodiment. During normal operation, the control terminal of the ESD clamp device is biased to be nonconductive.

Trigger circuit 503 is characterized as an RC trigger circuit and operates in a similar manner as trigger circuit 103. Circuit includes a resistor 509 and a capacitor 507 where the on-time period of circuit 503 is based on the RC constant of resistor 509 and capacitor 507. Trigger circuit 503 also includes a NFET 505 and resistor 513. The source of PFET 511 is connected to rail 517 and the drain of PFET 511 provides the TRIGGER signal. In some embodiments, trigger circuit 503 is coupled to a separate boost bus (not shown) which itself is coupled to rail 517 through other devices. In such embodiments, the trigger circuit would sense conditions of the boost bus to determine that there is an ESD event affecting rail 517. Trigger circuits of other embodiments may have other configurations, other circuitry, and/or operate in other manners (e.g., similar to trigger circuits 203 and 303). For example, a trigger signal may be a current signal where the clamp transistors include bipolar transistors.

In the embodiment shown, ESD clamp transistor NFET 505 includes two sets of one or more body contacts. The first body contact set 525 of one or more body contacts is connected to the VSS rail 119. The second body contact set 525 is connected to the input of a clamp activation circuit 531. The two sets 523 and 525 are located in different areas of the body region of transistor 505 such that there is an internal resistance 521 in the body region between the two sets. See for example, FIG. 11 and the discussion thereof below.

As explained above, for electrical stress events of sufficient severity (intensity/duration), impact ionization may occur in an ESD clamp device (transistor 505) which could permanently damage the clamp device. Accordingly, ESD circuit 501 includes a clamp activation circuit 531 with an input connected to body contact set 523. Based on a condition of set 523 that is indicative of an electrical stress event of sufficient severity, circuit 531 activates a clamp device coupled to both rails 517 and 519 to transfer charge of the electrical stress event between the rails so as to reduce the potential for damage to NFET 505 (and other circuitry as well). In some embodiments, circuit 531 activates a separate clamp device 533 to transfer electrical stress charge (see the embodiments of FIGS. 6, 8, and 9). In other embodiments, clamp activation circuit 531 includes an output 541 connected to the input of NFET 505 for asserting a signal to make NFET 505 conductive to transfer electrical stress charge (see the embodiment of FIG. 10).

In embodiments where the ESD clamp device includes multiple clamp transistors in series, a clamp activation circuit may be connected to a body contact set of one clamp transistor of the series or separate clamp activation circuits may be connected to each clamp transistor of the series. For example, in some embodiments where the clamp transistors share a common body region and the transistor gates are in close proximity to each other such that the two clamp transistors have a shared bipolar mode, one activation circuit is connected to a body contact set of one clamp transistor (or to a common body contact set of both clamp transistors) at a region where impact ionization is most likely to occur. In some embodiments where the body regions of each clamp transistor are isolated from each other or the body regions of each clamp transistor are physically separate from each other by a sufficient substrate distance such that they have separate bipolar modes, then a separate clamp activation circuit would be connected to the body contact set of each clamp transistor.

Figure 6:
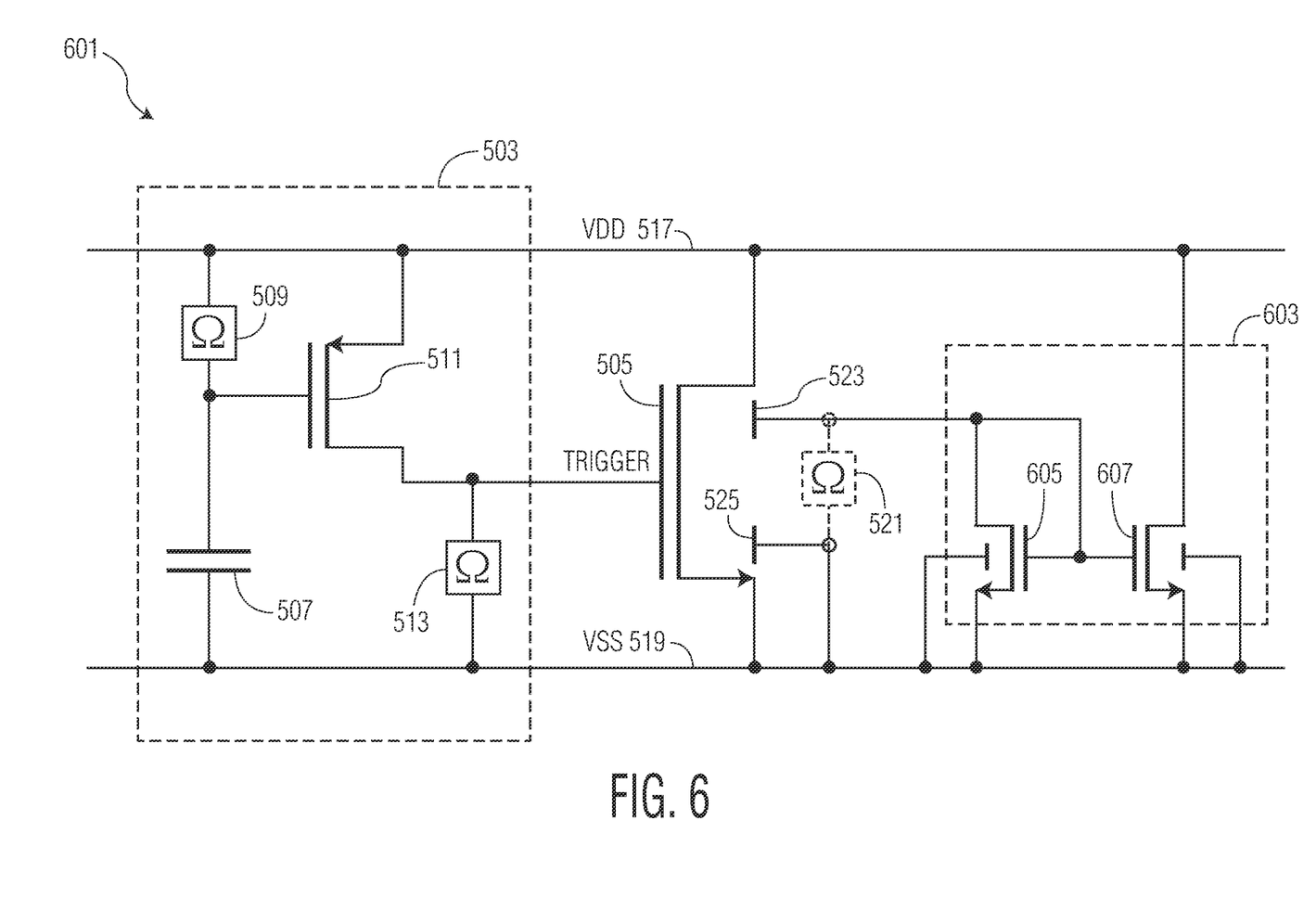
FIG. 6 is a more detailed circuit diagram of an ESD circuit according to one embodiment of the present invention.

FIG. 6 is a more detailed circuit diagram of an ESD circuit according to one embodiment of the present invention. ESD circuit 501 includes a trigger circuit 503 that is similar to RC trigger circuit 503 shown in FIG. 5 with items having the same numbers being similar. However, other types of trigger circuits may be used in other embodiments. In the embodiment shown, the ESD clamp device is implemented with a single NFET 505, but other types of clamp devices may be used on other embodiments.

The clamp activation circuit of circuit 601 is implemented with an NFET 605 whose drain and gate are connected to body contact set 523 and whose source and body region are connected to VSS rail 519. The clamp device is implemented with an NFET 607 having a drain connected to rail 517, a gate connected to the gate of NFET 605, and a drain and body region connected to VSS rail 519.

NFET 605 and NFET 607 are arranged in a current mirror configuration (current mirror 603) where NFET 605 is the setting transistor and NFET 607 is the mirror transistor. In one embodiment, NFETs 605 and 607 have a threshold voltage of 0.6 volts or less. During an electrical stress event in which impact ionization occurs in clamp transistor 505, ionization current flows from body contact set 523 through NFET 605 to set a voltage at the gate of NFET 607 that controls the amount of electrical stress current being discharged from rail 517 to rail 519. In one embodiment, NFET 607 is significantly larger (e.g., 2-100 times) than NFET 605 so that the discharge current through NFET 607 is proportionally larger than the ionization current through NFET 605. Accordingly, clamp NFET 607 is only conducive when impact ionization is occurring in clamp transistor 505.

Figure 7:
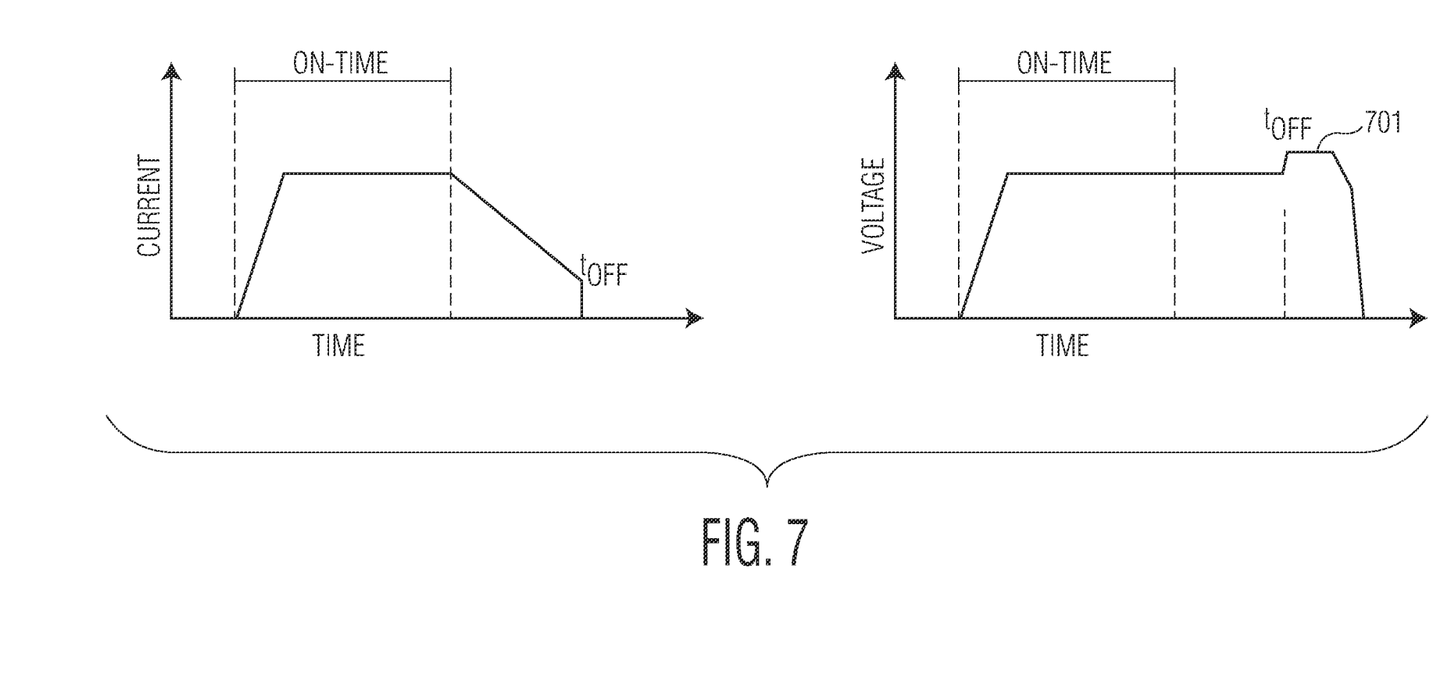
FIG. 7 is a graph of current and voltage of an ESD circuit during and electrical stress event according to one embodiment of the present invention.

FIG. 7 is a graph of current and voltage of an ESD clamp transistor (NFET 505) during an electrical stress event similar to that described above with respect to FIG. 4 where a supply voltage is abruptly applied to a VDD pad (not shown) of a semiconductor die via a cable (not shown) containing a relatively significant amount of inductance and the electrical stress event is severe enough to cause impact ionization in NFET 505. At the end of the on-time of trigger circuit 503, the current through NFET 505 starts to decline to a point where NFET 505 is turned off of $t_{OFF}$. However, as described above with respect to FIG. 4, the inductance of the supply cable continues to feed current where the voltage of rail 517 spikes (see spike 701) to cause impact ionization in NFET 505.

Because current mirror 603 conducts current in response to impact ionization current from body contact set 523, electrical stress charge from VDD supply rail 517 is transferred through NFET 607 to rail 519 after the on-time of NFET 505 has lapsed to reduce the voltage of spike 701 as compared to the voltage of spike 401 of FIG. 4. Accordingly, with the clamp activation circuit and clamp device (implemented with current mirror 603) of circuit 601, NFET 505 can be protected from impact ionization damage of electrical stress events that are more severe than a typical ESD event.

Figure 8:
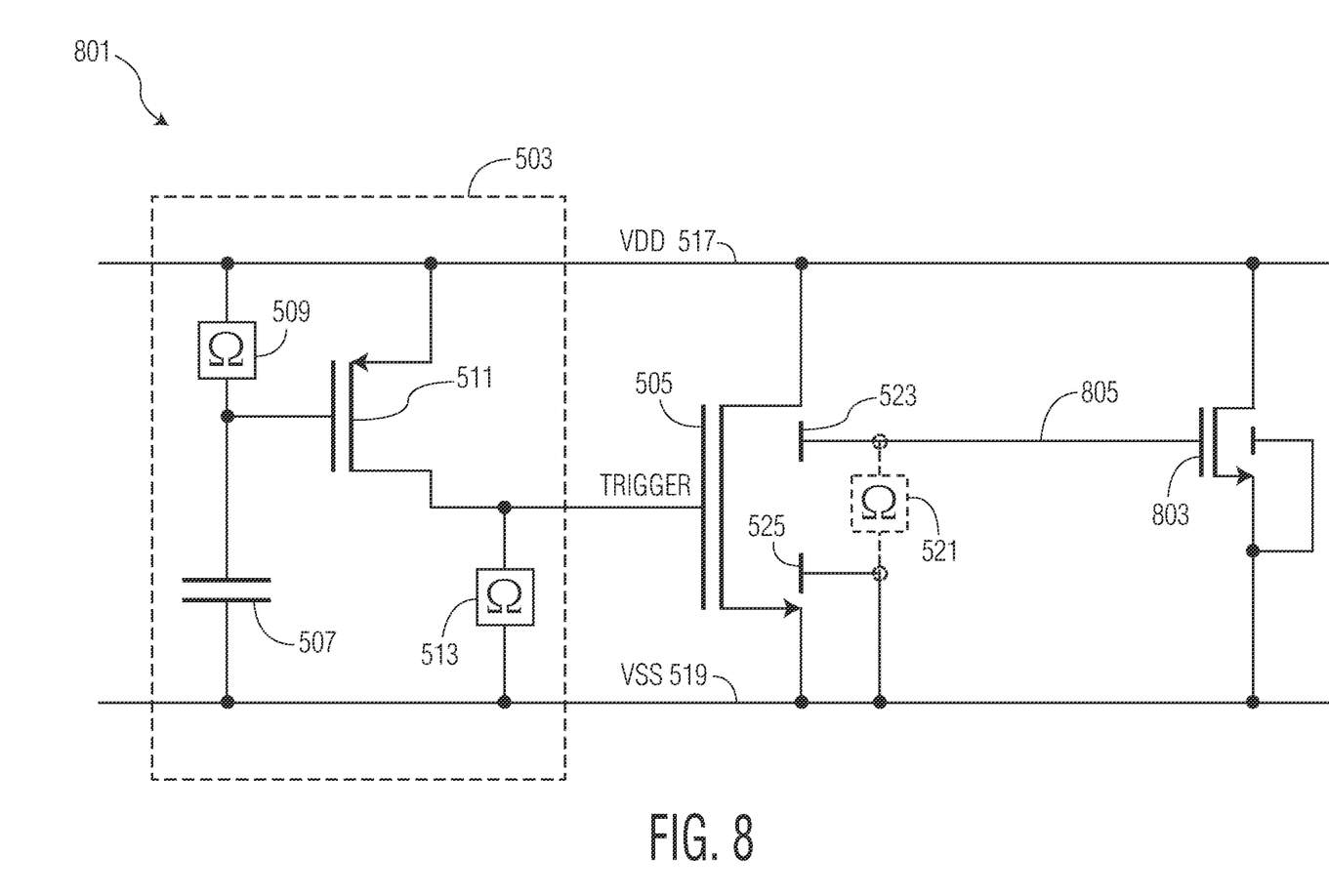
FIG. 8 is a more detailed circuit diagram of an ESD circuit according to one embodiment of the present invention.

FIG. 8 is a more detailed circuit diagram of an ESD circuit according to one embodiment of the present invention. ESD circuit 501 includes a trigger circuit 503 that is similar to the RC trigger circuit 503 shown in FIG. 5 with items having the same numbers being similar. However, other types of trigger circuits may be used in other embodiments. In the embodiment shown, the ESD clamp device is implemented with a single NFET 505, but other types of clamp devices may be used on other embodiments.

The clamp activation circuit of ESD circuit 801 is implemented with a signal line 805 and the clamp device is implemented with NFET 803. Signal line 805 is connected at one end to body contact set 523 and to the gate of NFET 803 at the other end. NFET 803 includes a drain connected to VDD supply voltage rail 517 and a source and body region connected to VSS supply voltage rail 519. In some embodiments, NFET 803 has a threshold voltage of 0.6 volts or less.

During impact ionization in NFET 505, ionization current flows from the drain of NFET 505 through the body region of NFET 505 through body contact set 525 to VSS supply voltage rail 519. Because of the resistance 521 of the body region between body contact set 523 and body contact set 525, a voltage differential between body contact set 523 and VSS supply voltage rail 519 occurs during impact ionization. NFET 803 conducts when the voltage differential exceeds the threshold voltage of NFET 803 to discharge electrical stress current from VDD rail 517. A lower threshold voltage of NFET 803 allows for the clamp device to turn on faster and stay on longer during the occurrence of impact ionization. With the embodiment of FIG. 8, the clamp activation circuit has a simpler design.

Figure 9:
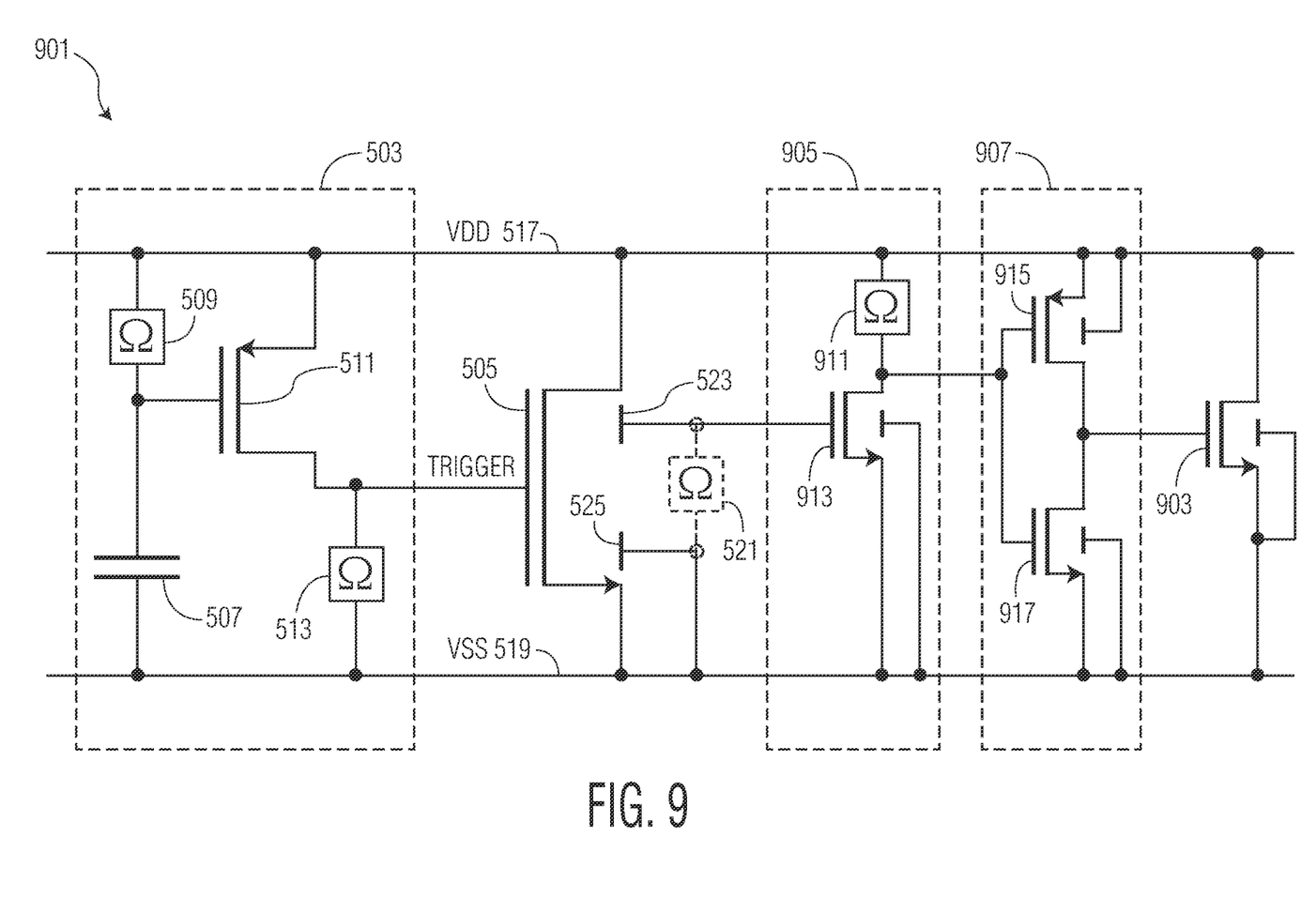
FIG. 9 is a more detailed circuit diagram of an ESD circuit according to one embodiment of the present invention.

FIG. 9 is a more detailed circuit diagram of an ESD circuit according to one embodiment of the present invention. ESD circuit 501 includes a trigger circuit 503 that is similar to the RC trigger circuit 503 shown in FIG. 5 with items having the same numbers being similar. However, other types of trigger circuits may be used in other embodiments. In the embodiment shown, the ESD clamp device is implemented with a single NFET 505, but other types of clamp devices may be used on other embodiments.

The clamp activation circuit of circuit 901 is implemented with two inverters (905 and 907) coupled in series in a series signal path. Inverter 905 includes an NFET 913 having a gate connected the body contact set 523, a drain connected to resistor 911, and a source and body region connected to VSS rail 519. Resistor 911 is connected to VDD rail 517. The drain of NFET 913 is connected to the input of inverter 907, which is connected to the gates of PFET 915 and NFET 917. The source and body region of PFET 915 is connected to rail 517 and the drain is connected to the drain of NFET 917 at the output of inverter 907. The source and body region of NFET 917 are connected to rail 519.

The clamp device of circuit 901 is implemented with an NFET 903 having a drain connected to VSS rail 517, a gate connected to the drains of PFET 915 and NFET 917, and a source and body region connected to VSS rail 519. However other types of clamp devices (e.g., a PFET, multiple transistors in series) may be used in other embodiments.

During an electrical stress event of a severity that causes impact ionization in clamp transistor 505, a voltage differential between the voltage of body contact set 523 and the voltage of rail 519 rises above the threshold voltage of NFET 913 (e.g., 0.6 volts or less) to make NFET 913 conductive to pull the input node of inverter 907 to the voltage of VSS. In response, the output of inverter 907 rises above the threshold voltage of NFET 903 to make NFET 903 conductive to discharge electrical stress current from rail 517 to rail 519. Once the impact ionization current subsides to where the voltage differential of between body contact set 523 and VSS rail 519 is below the threshold voltage of NFET 913, NFET 903 stops conducting.

In other embodiments, the clamp activation circuit includes a different number of inverters in series (e.g., 1 or 3 or more). Also in other embodiments, the inverters may have other configurations. For example, inverter 905 may include a PFET in place of resistor 911 and inverter 907 may include a resistor in place of NFET 917.

One advantage of using a series of inverters for the activation clamp circuit as opposed to just a signal line 805 as in the embodiment of FIG. 8 is that a clamp transistor (NFET 903) with a higher threshold voltage can be used. In addition, the inverters can be used to increase the drive strength of the asserted signal provided to the gate of the clamp transistor (NFET 903). Also in some embodiments, if an odd number of inverters is used, a PFET may be used as a clamp device.

Figure 10:
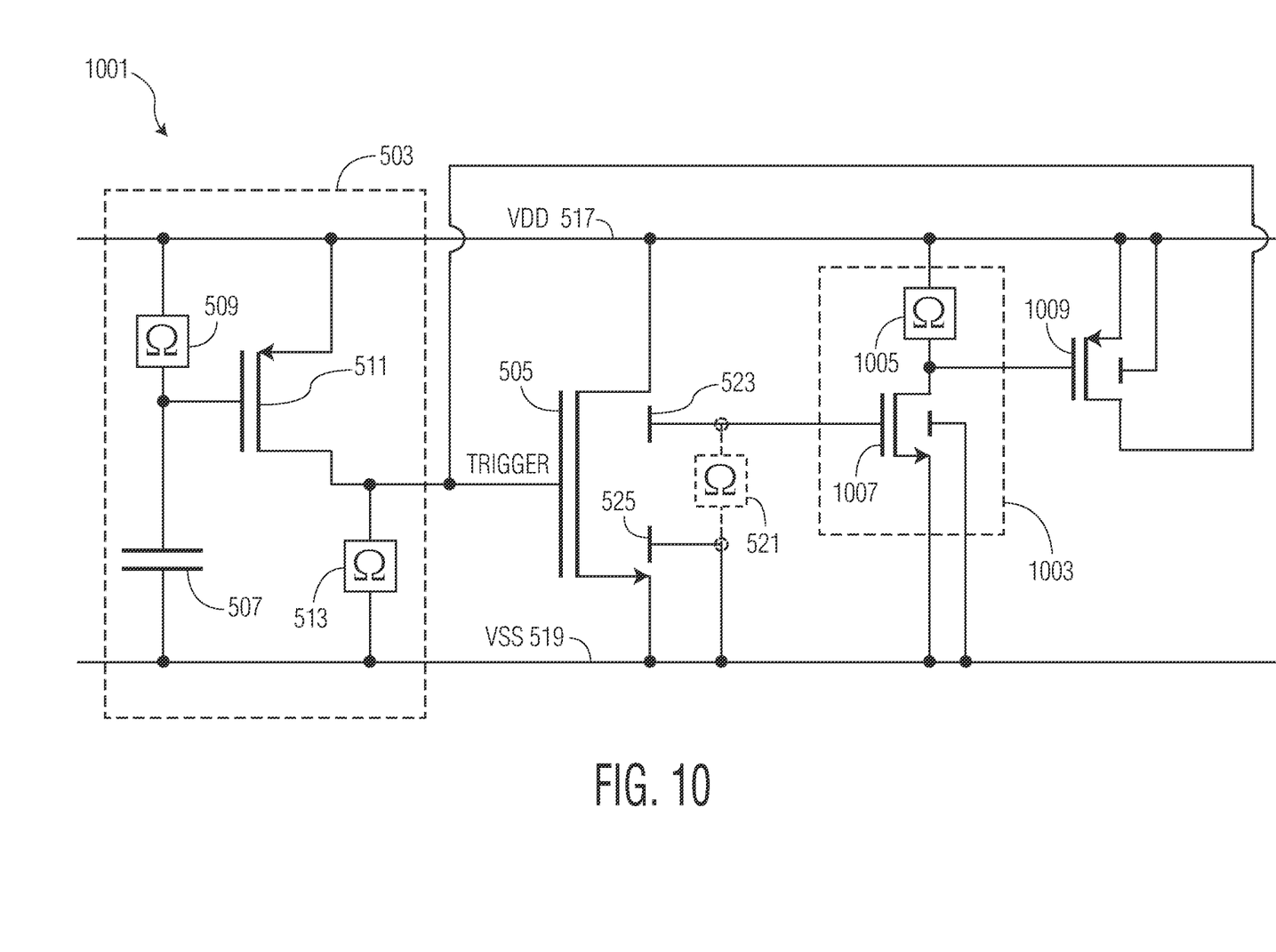
FIG. 10 is a more detailed circuit diagram of an ESD circuit according to one embodiment of the present invention.

FIG. 10 is a more detailed circuit diagram of an ESD circuit according to one embodiment of the present invention. ESD circuit 501 includes a trigger circuit 503 that is similar to the RC trigger circuit 503 shown in FIG. 5 with items having the same numbers being similar. However, other types of trigger circuits may be used in other embodiments. In the embodiment shown, the ESD clamp device is implemented with a single NFET 505, but other types of clamp devices may be used on other embodiments.

The clamp activation circuit of circuit 1001 is implemented with an inverter 1003 and latch transistor (PFET 1009). In the embodiment shown, inverter 1003 includes a resistor 1005 and an NFET 1007 having a gate connected to body contact set 523, a drain connected to resistor 1005 and the gate of PFET 1009, and a source and body region connected to VSS rail 519. The voltage differential between rail 317 and rail 319 that causes the assertion of the TRIGGER signal of circuit 303 is dependent upon by the cumulative threshold voltage of the string of diodes 309 and the threshold voltage of PFET 311. Resistor 1005 is connected to VDD rail 517. In some embodiments, NFET 1007 has threshold voltage of 0.6 volts or less.

The source and body region of PFET 1009 is connected to VDD rail 517. The drain of PFET 1009 connected to the gate of ESD clamp transistor 505. If during an electrical stress event when impact ionization occurs in clamp transistor 505 where the voltage differential between body contact set 523 and VSS rail 519 exceeds the threshold voltage of NFET 1007, NFET 1007 pulls the voltage of the gate of PFET 1009 towards the voltage of VSS which makes PFET 1009 conductive to bias the gate of clamp transistor 505 at a conductive state to continue discharging electrical stress current. Thus, in a situation described above where a supply cable with inductance continues to supply current to VDD rail 517 after the trigger circuit 503 has timed out and impact ionization occurs in transistor 505, PFET 1009 will be made conductive to turn transistor 505 back on to discharge the electrical stress current and alleviate the ionization condition in transistor 505.

One advantage of the configuration of circuit 1001 is that since the ESD clamp device (transistor 505) is used to dissipate charge, no extra clamp device is required.

Figure 11:
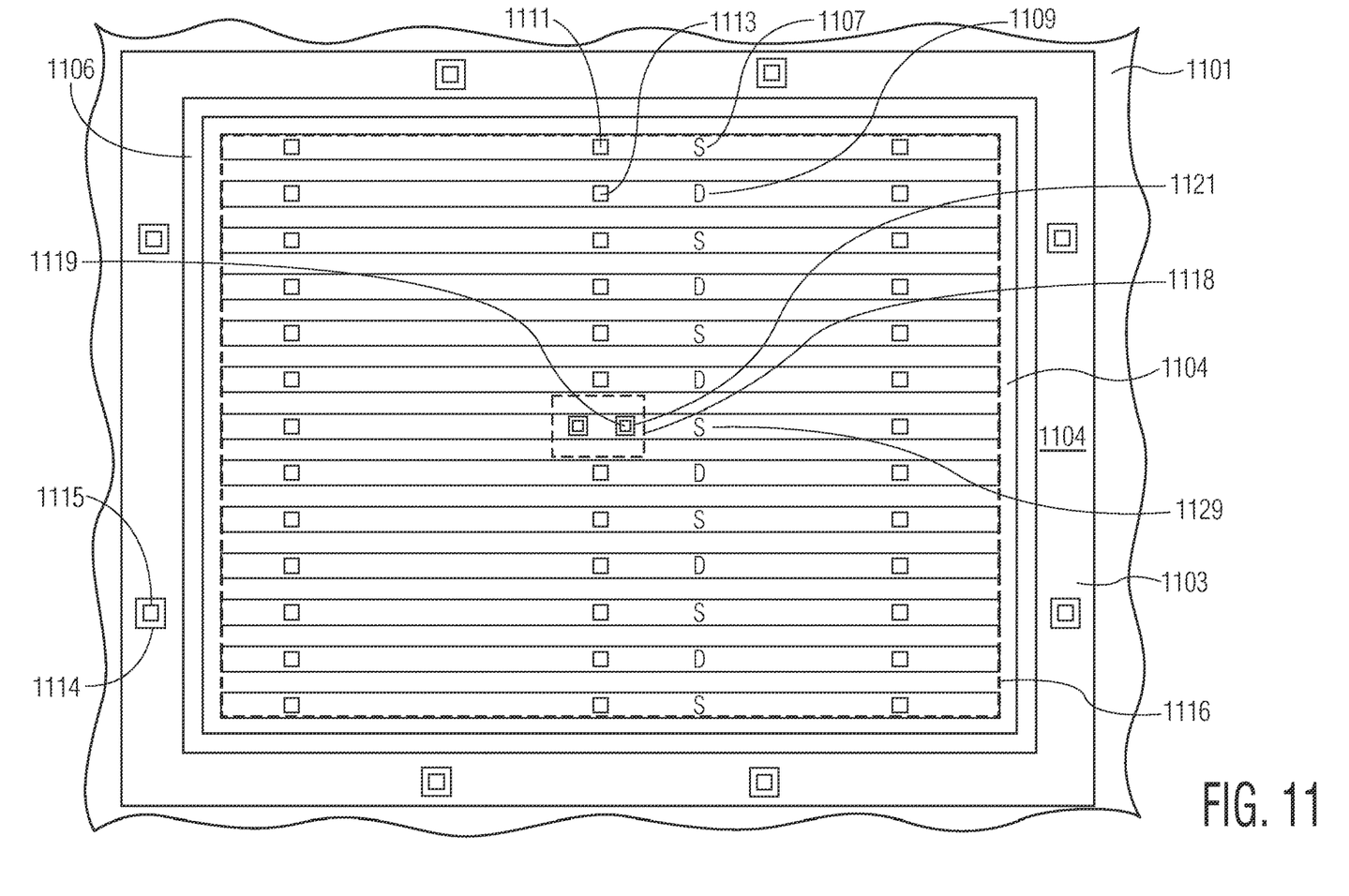
FIG. 11 is a top view of a portion of a substrate of a semiconductor die according to one embodiment of the present invention.

FIG. 11 is a partial top view of a substrate 1101 of a semiconductor die that includes and ESD circuit according to one embodiment. Not shown in FIG. 11 but located on top of substrate 1101 are gate structures, interconnect layers, and die terminals (e.g., bond pads, bond posts etc.). Substrate 1101 includes semiconductor material (e.g., silicon, silicon germanium, gallium nitride) in which semiconductor devices (e.g., transistors, diodes) are formed from regions doped with conductivity dopants.

FIG. 11 shows an embodiment of a segment of an ESD clamp transistor (e.g., transistor 505). The segment 1103 is located in a well of P-type conductivity dopants that forms the body region 1104 of the transistor. Located within an active area 1116 of the well are elongated N-type regions (doped with N-type dopants) that alternately serve as source regions (designated with an "S") (e.g., source region 1107) and drain regions (designated with a "D") (e.g., drain region 1109). The elongated doped regions are separated by portions of the body region 1104. Elongated gate structures (not shown) are located over the body region 1104 at locations between the source regions (S) and the drain regions (D).

FIG. 11 shows a number of contact locations (represented as squares in FIG. 11) where contacts are made with the doped substrate regions to connect the substrate regions to other circuitry through interconnect structures (not shown) in the interconnect region. For example, source region 1107 includes three contact locations (1111) and drain region 1109 includes three contact locations (1113). The contacts for each source region (e.g., at location 1111) of segment 1103 are electrically connected together and connected to VSS rail 519 (which is located in the interconnect layers). The contacts for each drain region (e.g., at contact location 1113) of segment 1103 are electrically connected together and electrically connected to VDD rail 517 (which is located in the interconnect layers). The elongated gate structures (not shown) are electrically connected together and electrically connected to the signal line that provides the TRIGGER signal to the gate of clamp transistor 505. In some embodiments, P-type body region 1104 is isolated from an underlying P-type doped substrate by a buried N-type layer (not shown) or a buried dielectric layer (not shown).

FIG. 11 shows locations for two sets of body contacts for body region 1104. Body contact set 525 is located around the perimeter of body region 1104 (e.g., at contact location 1115). Body contact set 523 is located in a center portion 1118 of area 1116. The body contact locations of each set are surround by an isolation structure (1114, 1121) for isolating the formed body contact from adjacent semiconductor material. For example, dielectric structure 1211 isolates body region 1104 at the surface of substrate 1101 at contact location 1119 from the oppositely doped source region 1129.

In the embodiment shown, center portion 1118 is a geometric center portion of area 1116. In one embodiment, all of the second set of body contacts are located within a 1 percent geometric center portion of area 1116. In other embodiments, all of the second set of body contacts are be located in a 10% geometric center portion of area 1116. In still other embodiments, all of the second set of body contacts are located in a 20% geometric center portion of area 1116.

In some embodiments during an electrical stress event, impact ionization first occurs in the geometric center of the body region of the active area of segment of a transistor. Accordingly, locating the second set 523 of body contacts in the geometric center region will enable the body contacts to provide an early indication of impact ionization. Thus, a clamp device can be activated before a clamp transistor is damaged.

In FIG. 11, the body contacts of body contact set 525 (e.g., contact location 1115) are located on the perimeter of body region 1104 outside of active area 1116. Accordingly, there is lateral separation in the body region between the body contacts of set 523 and the body contacts of set 525. Providing separation between the body contacts of set 525 connected to a supply rail (e.g., VSS for an NFET clamp transistor and VDD for a PFET clamp transistor) and the body contacts of set 523 connected to the clamp activation circuit 531 may provide for a resistance 521 in the body contact region between the body contact set 525 and body contact set 523. Such a resistance may allow for a voltage differential to be generated by ionization current between body contact set 523 and a supply rail (VSS rail 519) in FIGS. 5-10 that provides an indication of the severity of the electrical stress event and that impact ionization is occurring in transistor 505.

Located in body region 1104 is a region 1106 having a lower net concentration of a same type of conductivity dopants than the remainder of body region 1104. In the embodiment shown, region 1106 is implemented as a square ring that surrounds active area 1116 and is located between the inner set of body contacts (e.g., at contact location 1119) and the outer set of body contacts (e.g., at contact location 1115). The lower net conductivity type doping region 1106 between the two sets of body contacts may contribute to the resistance 521 between the body contact set 525 and body contact set 523. The amount of resistance provide by region 1106 is dependent upon the net dopant concentration difference between region 1106 and the remainder of body region 1104 and the lateral width of region 1106. In one embodiment, region 1106 has a net P-type doping concentration that is 10-100 times less than the net P-type doping concentration of the remainder of region 1104. In one example, resistance 521 may be in the range 50-100 ohms, but may be of other values in the other embodiments. However, the regions may have different net concentration differentials in other embodiments.

In one embodiment, the doping concentration of region 1106 is the native P-type doping concentration of an epitaxial layer (whose top surface is shown in FIG. 11) of substrate 1101. During wafer processing, region 1106 is masked during the implantation of additional P-type dopants into region 1104. However, region 1106 may be formed differently in other embodiments. For example, region 1106 may be formed by a relatively light counter doping of N-type dopants into body region 1104 where the net P-type doping concentration is lower than in the rest of body contact region 1104. In some embodiments, the body contacts of the outer set of body contacts (e.g., at contact location 1115) would be located in a region or at least partially in a region of the body region having the lower net conductivity dopant concentration than the inner set of body contacts (e.g., at contact location 1119). In still other embodiments, a clamp transistor would not include a lower net doping concentration region (e.g., like region 1106).

In other embodiments, the body contacts of both sets 523 and 525 would be intermixed in segment 1603. Also, a segment may include a different number of contacts per set than shown in FIG. 11. For example, each set may only include one body contact. In one embodiment, body contact set 525 would include ring shaped body contact that surrounds active area 116. In still other embodiments, a clamp transistor may include multiple segments where similar regions and structures of each segment are electrically connected to each other to provide a 5 terminal device (source, drain, gate, first body contact, and second body contact).

As set forth herein, providing a clamp activation circuit with two sets of at least one body contact and a clamp activation circuit having an output to assert a signal to make conductive a clamp device in response to an electrical stress event of a sufficient severity as indicated by a condition of one set of one or more body contacts may provide for a system that prevents damage to an ESD clamp transistor due to impact ionization from an electrical stress event. In addition, such a mechanism may operate effectively over a relatively wide range of temperatures.

As disclosed herein, one structure or region is "directly between" two other structures or regions in a line if the two structures or regions are located on opposite sides of the one structure or region in the line. For example, in FIG. 11, region 1109 is located directly between region 1107 and region 1129 in a horizontal line. A first structure or region is "directly lateral" to a second structure or region if the first structure or region and second structure or region are located in a line having a direction that is parallel with a generally planar major side of the substrate. For example, region 1107 and region 1109 are directly lateral to each other. A first structure or region laterally surrounds a second structure or region if the first structure or region surrounds the second structure or region in a line having a direction that is parallel with a generally planar major side of the substrate. A vertical line is a line that is perpendicular with a generally planar major side of the substrate.

A gate is a control terminal for a FET. A source and a drain are current terminals for a FET.

Features specifically shown or described with respect to one embodiment set forth herein may be implemented in other embodiments set forth herein.

In one embodiment, a circuit includes an ESD clamp device including a clamp transistor. The clamp transistor includes a first current terminal coupled to a first supply voltage rail and a second current terminal coupled to a second supply voltage rail. When made conductive, the clamp transistor is conductive to transfer charge between the first supply voltage rail and the second supply voltage rail. During normal operation, the clamp transistor is biased to be in a nonconductive state. The clamp transistor includes a first set of one or more body contacts coupled to one of the first supply voltage rail or the second supply voltage rail and a second set of one or more body contacts. The circuit includes an electrostatic discharge (ESD) trigger circuit configured to detect an ESD event affecting the first supply voltage rail. In response to detecting an ESD event, the ESD trigger circuit asserts an output signal to make the clamp transistor conductive. The circuit includes a clamp activation circuit including an input coupled to the second set of one or more body contacts and including an output coupled to a control terminal of a clamp device including a first current terminal coupled to the first supply voltage rail and a second current terminal coupled to the second supply voltage rail. During an electrical stress event of a sufficient severity as indicated by a condition of the second set of one or more body contacts, the clamp activation circuit makes the clamp device conductive to transfer charge between the first supply voltage rail and the second supply voltage rail.

In another embodiment, a circuit includes an ESD clamp transistor. The ESD clamp transistor includes a first current terminal coupled to a first supply voltage rail and a second current terminal coupled to a second supply voltage rail. When made conductive, the ESD clamp transistor is conductive to transfer charge between the first supply voltage rail and the second supply voltage rail. During normal operation, the ESD clamp transistor is in a nonconductive state. The ESD clamp transistor includes a first set of one or more body contacts coupled to one of the first supply voltage rail or the second supply voltage rail and a second set of one or more body contacts. The circuit includes an electrostatic discharge (ESD) trigger circuit configured to detect an ESD event affecting the first supply voltage rail. In response to detecting an ESD event, the ESD trigger circuit asserts an output signal to make the ESD clamp transistor conductive. The circuit includes a clamp activation circuit including an input coupled to the second set of one or more body contacts and including an output coupled to a control terminal of a clamp device including a first current terminal coupled to the first supply voltage rail and a second current terminal coupled to the second supply voltage rail. During an electrical stress event of a sufficient severity where impact ionization develops in the ESD clamp transistor as indicated by a condition of the second set of one or more body contacts, the clamp activation circuit makes the clamp device conductive to transfer charge between the first supply voltage rail and the second supply voltage rail.

While particular embodiments of the present invention have been shown and described, it will be recognized to those skilled in the art that, based upon the teachings herein, further changes and modifications may be made without departing from this invention and its broader aspects, and thus, the appended claims are to encompass within their scope all such changes and modifications as are within the true spirit and scope of this invention.

What is claimed is:

1. A circuit comprising:
   an ESD clamp device including a clamp transistor, the clamp transistor including:
      a first current terminal coupled to a first supply voltage rail;
      a second current terminal coupled to a second supply voltage rail, wherein when made conductive, the clamp transistor is conductive to transfer charge between the first supply voltage rail and the second supply voltage rail, wherein during normal operation, the clamp transistor is biased to be in a non-conductive state;
      a first set of one or more body contacts coupled to one of the first supply voltage rail or the second supply voltage rail;
      a second set of one or more body contacts;
   an electrostatic discharge (ESD) trigger circuit configured to detect an ESD event affecting the first supply voltage rail, in response to detecting an ESD event, the ESD trigger circuit asserts an output signal to make the clamp transistor conductive;
   a clamp activation circuit including an input coupled to the second set of one or more body contacts and including an output coupled to a control terminal of a clamp device including a first current terminal coupled to the first supply voltage rail and a second current terminal coupled to the second supply voltage rail, wherein during an electrical stress event of a sufficient severity as indicated by a condition of the second set of one or more body contacts, the clamp activation circuit makes the clamp device conductive to transfer charge between the first supply voltage rail and the second supply voltage rail.

2. The circuit of claim 1 wherein:
   the clamp activation circuit includes a setting transistor that includes a control terminal coupled to the second set of one or more body contacts;
   the clamp device includes a mirror transistor including a first current terminal coupled to the first supply voltage rail, a second current terminal coupled to the second supply voltage rail, and a control terminal coupled to the second set of one or more body contacts;
   wherein the setting transistor and the mirror transistor are configured in a current mirror configuration.

3. The circuit of claim 2 wherein during an electrical stress event of a sufficient severity where impact ionization develops in the clamp transistor, impact ionization current flows from the second set of one or more body contacts through a first current terminal and a second current terminal of the setting transistor to control the current through the mirror transistor from the first supply voltage rail to the second supply voltage rail for transferring charge from the first supply voltage rail to the second supply voltage rail.

4. The circuit of claim 1 wherein the clamp device is the clamp transistor.

5. The circuit of claim 4 wherein the a clamp activation circuit includes a latch transistor having a first current terminal coupled to one of the first supply voltage rail or the second supply voltage rail and a second current transistor coupled the control terminal of the clamp transistor.

6. The circuit of claim 5 wherein during an electrical stress event of a sufficient severity, the latch transistor is made conductive to pull the voltage of the control terminal of the clamp transistor to a voltage of the one of the first supply voltage rail or the second supply voltage rail to where the clamp transistor is in a conductive state where charge is transferred between the first supply voltage rail and the second supply voltage rail.

7. The circuit of claim 1 wherein:
   the clamp device includes a second clamp transistor including a first current terminal coupled to the first supply voltage rail, a second current terminal coupled to the second supply voltage rail, and a control terminal;
   the clamp activation circuit includes a signal line coupled at one end to the second set of one or more body contacts and at a second end to the control terminal of the second clamp transistor.

8. The circuit of claim 7 wherein the second clamp transistor has a threshold voltage of 0.6 volts or less.

9. The circuit of claim 1 wherein the clamp activation circuit includes at least one inverter configured in a series signal path between the second set of one or more body contacts and a control terminal of the clamp device.

10. The circuit of claim 9 where a first invertor of the at least one inverter in the series signal path includes a transistor that has a threshold voltage of 0.6 volts or less.

11. The circuit of claim 9 wherein:
    the clamp device includes a second clamp transistor including a first current terminal coupled to the first supply voltage rail, a second current terminal coupled to the second supply voltage rail, and a control terminal;
    the clamp activation circuit includes two invertors, wherein an output of a second inverter in the series signal path is connected to the control terminal of the second clamp transistor.

12. The circuit of claim 1 wherein the second set of one or more body contacts are connected to the control terminal of a transistor that has a threshold voltage of 0.6 volts or less.

13. The circuit of claim 1 wherein the clamp transistor is implemented in a semiconductor die with a group of one or more segment areas of the semiconductor die wherein each segment area includes:
    an active area of alternating elongated source regions and drain regions separated by a body region;
    wherein the body contacts of the second set of one or more body contacts of the segment area are located in a geometric middle 10 percent of the active area of the segment area.

14. The circuit of claim 13 wherein the body contacts of the first set of one or more body contacts are located in edge regions of the one or more segment areas.

15. The circuit of claim 13 wherein for each segment area, the body contacts of the second set are located in a portion of the body region that has a first net conductivity type dopant concentration, wherein the body contacts of the first set are each coupled in a path of the body region to the portion of the body region through a second portion of the body region having a lower net conductivity type dopant concentration than the first net conductivity type dopant concentration.

16. The circuit of claim 1 wherein in response to detecting an ESD event, the ESD trigger circuit asserts the output signal to make the clamp transistor conductive for a period of time, wherein if the ESD event is an electrical stress event of a sufficient severity, the clamp activation circuit makes the clamp device conductive for a time including after the period of time.

17. The circuit of claim 1 wherein during an electrical stress event of a sufficient severity, the input of the clamp activation circuit is at a higher voltage than the first set of one or more body contact regions.

18. The circuit of claim 1, wherein during normal operation, the clamp device is biased to be nonconductive.

19. A circuit comprising:
 a ESD clamp transistor, the ESD clamp transistor including:
  a first current terminal coupled to a first supply voltage rail;
  a second current terminal coupled to a second supply voltage rail, wherein when made conductive, the ESD clamp transistor is conductive to transfer charge between the first supply voltage rail and the second supply voltage rail, wherein during normal operation, the ESD clamp transistor is in a nonconductive state;
  a first set of one or more body contacts coupled to one of the first supply voltage rail or the second supply voltage rail;
  a second set of one or more body contacts;
 an electrostatic discharge (ESD) trigger circuit configured to detect an ESD event affecting the first supply voltage rail, in response to detecting an ESD event, the ESD trigger circuit asserts an output signal to make the ESD clamp transistor conductive;
 a clamp activation circuit including an input coupled to the second set of one or more body contacts and including an output coupled to a control terminal of a clamp device including a first current terminal coupled to the first supply voltage rail and a second current terminal coupled to the second supply voltage rail, wherein during an electrical stress event of a sufficient severity where impact ionization develops in the ESD clamp transistor as indicated by a condition of the second set of one or more body contacts, the clamp activation circuit makes the clamp device conductive to transfer charge between the first supply voltage rail and the second supply voltage rail.

20. The circuit of claim 19 wherein in response to detecting an ESD event, the ESD trigger circuit asserts the output signal to make the ESD clamp transistor conductive for a period of time, wherein if the ESD event is an electrical stress event of a sufficient severity, the clamp activation circuit makes the clamp device conductive for a time including after the period of time.

* * * * *